US008832732B2

(12) United States Patent
Fano et al.

(10) Patent No.: US 8,832,732 B2
(45) Date of Patent: Sep. 9, 2014

(54) CONTROLLED MULTI-MEDIA PROGRAM REVIEW

(75) Inventors: Andrew E. Fano, Lincolnshire, IL (US); Kelly L. Dempski, Evanston, IL (US); Christopher Kim Chung, Walnut Creek, CA (US)

(73) Assignee: Accenture Global Services Limited, Dublin (IE)

( * ) Notice: Subject to any disclaimer, the term of this patent is extended or adjusted under 35 U.S.C. 154(b) by 1550 days.

(21) Appl. No.: 10/826,227

(22) Filed: Apr. 16, 2004

(65) Prior Publication Data

US 2004/0268398 A1    Dec. 30, 2004

Related U.S. Application Data

(60) Provisional application No. 60/463,308, filed on Apr. 16, 2003.

(51) Int. Cl.
| | | |
|---|---|---|
| H04N 7/173 | (2011.01) | |
| H04N 7/10 | (2006.01) | |
| H04N 7/025 | (2006.01) | |
| G11B 27/28 | (2006.01) | |
| G11B 27/10 | (2006.01) | |

(52) U.S. Cl.
CPC ............. *G11B 27/28* (2013.01); *G11B 27/107* (2013.01); *G11B 2220/20* (2013.01); *G11B 27/105* (2013.01)
USPC ................... 725/34; 725/32; 725/86; 725/88; 725/90

(58) Field of Classification Search
None
See application file for complete search history.

(56) References Cited

U.S. PATENT DOCUMENTS

| 5,410,326 A | * | 4/1995 | Goldstein | 348/734 |
|---|---|---|---|---|
| 6,947,573 B2 | * | 9/2005 | Linnartz | 382/100 |
| 2002/0069218 A1 | | 6/2002 | Sull et al. | |
| 2002/0144262 A1 | * | 10/2002 | Plotnick et al. | 725/32 |
| 2003/0035648 A1 | * | 2/2003 | Lopez-Estrada et al. | 386/95 |
| 2005/0177864 A1 | * | 8/2005 | Terakado et al. | 725/142 |
| 2011/0051018 A1 | * | 3/2011 | Shintani et al. | 348/734 |

FOREIGN PATENT DOCUMENTS

WO    WO 02/010400 A2    12/2002

OTHER PUBLICATIONS

Martinez, Jose M.; MPEG-U Overview; http://mpeg.telecomitalialab.com/stndards/mpeg-u/mpeg-7.htm; Jul. 2002; International Organisation for Standardisation, ISO/IEC JTC1/SC29/WG11 N4980, Coding of Moving Pictures and Audio; Klangenfurt.
Kampermann et al.; "Call for Contributions on: Rights Management & Protection System Technologies;" Internet Article; Sep. 24, 2001; XP002246994; p. 35-p. 36.
European Search Report for European Patent Application No. 04252260.7 dated Aug. 5,2004.

(Continued)

*Primary Examiner* — Nasser Goodarzi
*Assistant Examiner* — Fred Peng
(74) *Attorney, Agent, or Firm* — Harrity & Harrity, LLP

(57) ABSTRACT

The time required to review or playback multi-media program material can be controlled to reduce the time required to review a program. Segments of the program are indexed to mark their beginning and/or end. By detecting segments in the program material, segments can be selectively played back that are of interest to a viewer with other segments being skipped over.

21 Claims, 14 Drawing Sheets

(56) References Cited

OTHER PUBLICATIONS

Taub, "Technology; ReplayTV's New Owners Drop Features That Riled Hollywood," The New York Times, Jul. 21, 2003, 2 pages, www.nytimes.com/2003/07/21/business/technology-replaytv-s-new-owners-drop-features-that-riled-hollywood.html.

Shim, "Hidden ad-skipping feature found in TiVO," CNET News, Jan. 15, 2003, 3 pages, news.cnet.com/2100-1040-980829.html.

* cited by examiner

CONTROLLED MULTI-MEDIA PROGRAM REVIEW

This application claims the benefit of U.S. Provisional Application Ser. No. 60/463,308 filed Apr. 16, 2003, entitled "Controlled Multi-Media Program Review", having as inventors Andrew E. Fano, Kelly L. Dempski and Christopher K. Chung, and owned by instant assignee.

BACKGROUND OF THE INVENTION

To many viewers, multimedia programs contain only a relatively small-amount of interesting content combined with a larger amount of uninteresting and unwanted content, including unwanted programming and/or commercial messages. By way of example, professional sporting events such as football and baseball games have only a few minutes of real action interleaved into much more lengthy segments of commentary and commercials. Indeed, most video and audio programming is riddled with advertising that increases the overall time required to view content of interest to the viewer. There is thus a need in the art for improvements that would provide viewers with improved control over viewed content and the ability to experience interesting content in a minimum amount of time.

Videocassette recorders (VCR's) and more recently, digital video recorders (DVR's) have enabled some degree of viewer control over content viewing. But these known devices do not offer a degree of control that permits seamless and tailored content viewing and an associated minimization of viewing time. VCR's are in widespread use to record programming material onto a tape and, at a later time enable sequential fast-forward through commercials or unwanted programming. While this practice reduces the time required to view subject matter of interest, it still requires the viewer to monitor the content at high speed to detect segments of interest.

DVR's, such as Tivo® and ReplayTV® enable a viewer to store content in digital form, typically on a hard disk, for playback. These devices can be programmed to record selected programs according to criteria selected by the viewer. The programs are recorded in their entirety, and may be later played back with some control over the content. For example, some DVR's offer features that enable the user to skip program segments of a predetermined length of time to permit quick advancement past commercials. Others perform some sensing of commercials "on the fly" and advance past advertisements by detecting relative audio levels between commercials and non-commercial content. In addition, some digital media players, such as DVD players, offer bookmarking or chapter references that permit some degree of viewer navigation and control of content on playback. However, these known devices offer only limited viewer control of content playback, usually according to predetermined criteria that is not particular or customizable according to the viewer's content interests or preferences and they fall short of permitting the viewer to select and experience only interesting content in a minimal amount of time. There is thus a need in the art for a system and method that addresses these shortcomings. In addition, today's television advertising models are still premised on the assumption that content will be viewed in total and that viewers lack the control over content that would permit them to avoid advertising that is of no interest. However, as users gain increasing control over viewed content, they have increasingly used this control to avoid advertising. What is needed are systems and methods of providing advertising content to viewers in a manner that offers more potential for advertising to be viewed by users that have enhanced control over viewed content.

SUMMARY OF THE INVENTION

A method and apparatus for controlling the playback of multi-media content selects for playback, a first segment based on the detection of one or more indexes in the multi-media program material, based on a first criteria. Content segments that do not satisfy the first criteria are suppressed.

Placement of an index can identify where a segment is located. Segments to be played back can be identified according to the indexes or the content of indexes. Playing back an indexed multi-media program becomes a concatenation of segments that satisfy certain criteria.

DETAILED DESCRIPTION OF THE PREFERRED EMBODIMENTS

Figure 1:
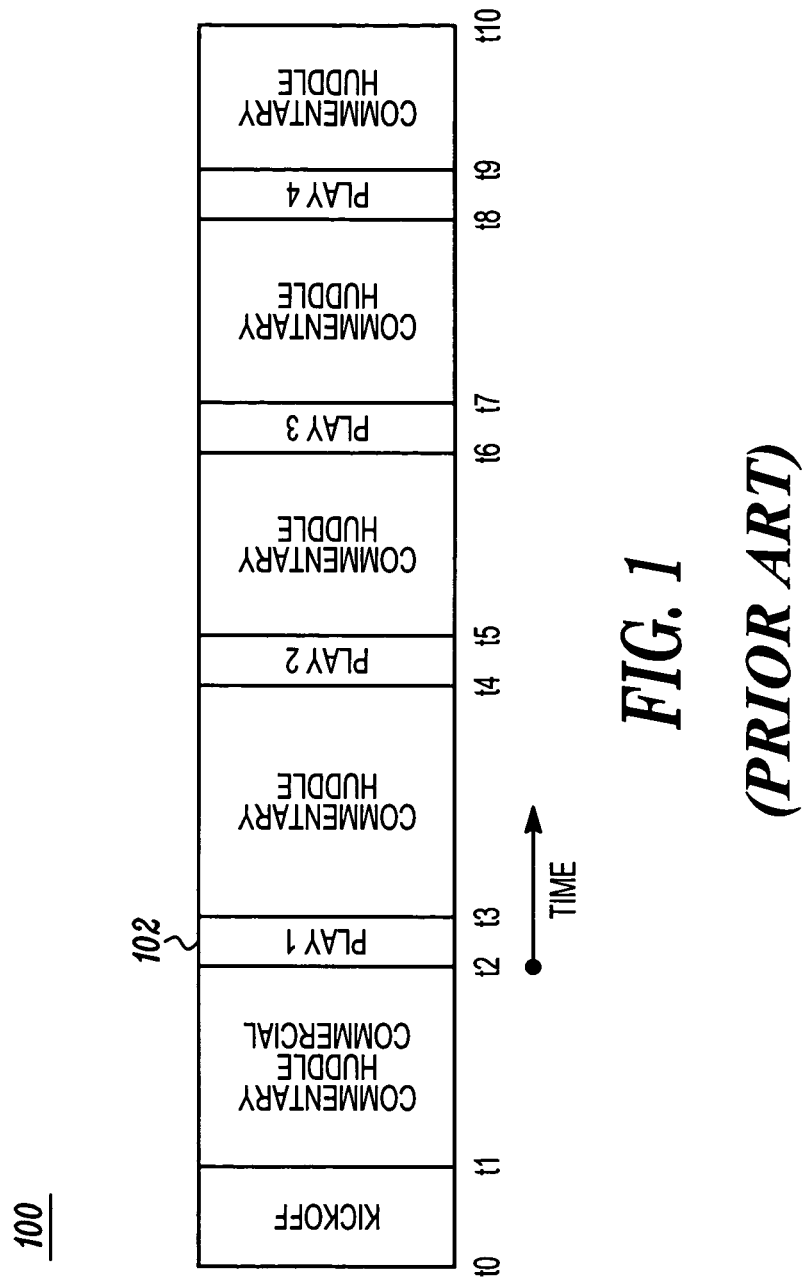
FIG. 1 shows locations of different segments of a multi-media program on a storage media and the segments indexed in or on the media, as known in the art.

FIG. 1 shows a representation of how a multi-media program such as a football game is comprised of, and can be divided into segments. The program segments exist along different portions of a videotape, magnetic disk, optical disk or other storage media 100 after the game is recorded onto the media 100, which is known in the art. The location and duration of various different segments of such a multi-media program are depicted in terms of the relative times of occurrence and duration with the times denoted in FIG. 1 as t0, t1, t2, and so forth.

Many multi-media programs can be considered to be made up of segments with segments being specified many possible ways. Segments can be specified by what is depicted or shown, e.g., action scenes vs. love scenes; a particular actor or actress; a theme or a mood; audio or sounds; or products or services depicted. In the example above, the portion of a football game between the time when the football is kicked and the referee's whistle signaling the play's conclusion can be considered a "segment." Plays captured from a particular camera angle, showing fans or bystanders can be considered to be different segments.

As is well-known, there is no actual football played after the referee's whistle and during which the opposing teams' kick-off units leave the field and the respective defensive and offensive units enter the field. The time after the referee's whistle up to the next play can be considered to be another segment of the game. In a movie, action scenes or love scenes, depictions of a particular background, including a particular actor, can be considered to be different segments. In a broadcast program, commercial messages can be considered to be segments. Within a series of commercials within a program, the commercials of a particular product or of a particular manufacturer can be considered to be different segments, such as beer commercials vis-a-vis automobile commercials.

Suppressing segments of a multi-media program that are of no interest to a viewer enables the viewer to control the program's playback. In a preferred embodiment, suppressing a multi-media segment is accomplished by skipping over segments of a multi-media program that are indexed as being of no interest to a viewer. In a preferred embodiment, suppression of a segment entails playing back one segment of interest and while that segment is playing, locating the next segment to be played by finding an index that so identifies a segment of interest. Skipping over segments is accomplished almost instantaneously if the multi-media program material is stored in a high-speed storage media that enables a controller to locate a next segment for playback without having to materially or substantially interrupt the presentation multi-media.

Figure 2:
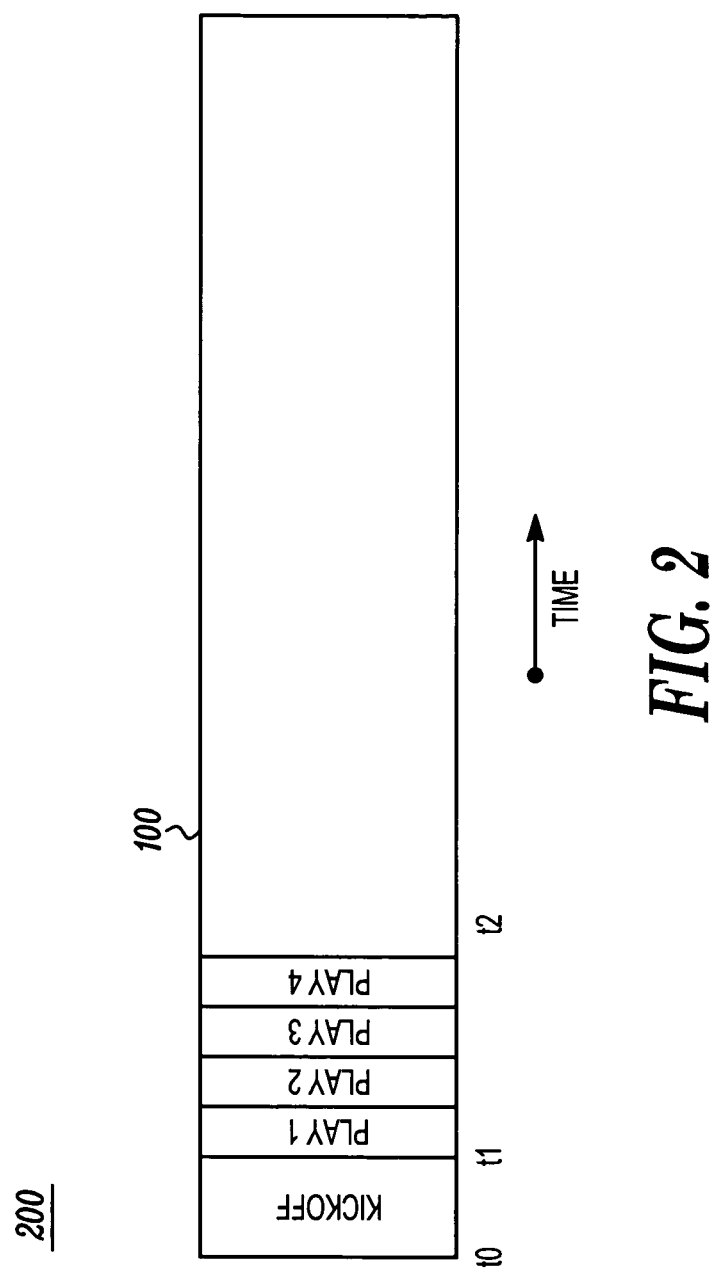
FIG. 2 shows an example of how certain content segments that are of interest to a viewer can be played back in less time when only the content segments of interest are played back and other segments suppressed.

In FIG. 2, segments of the media 100 depicted in FIG. 1 and in which hypothetical plays of a hypothetical game were recorded, are depicted adjacent to each other on the tape or other media 100 in order to show that the amount of time required to review just actual plays of the game (the four plays depicted in FIG. 1.) is less than the amount of time required to view the plays and commentary between time segments t1 and t2. By eliminating or suppressing the play back of program segments that are of no interest to the viewer, and instead viewing only segments that are of interest, the time required to review a multi-media program, such as a professional sporting event, can be significantly reduced into a much shorter time period.

Figure 3:
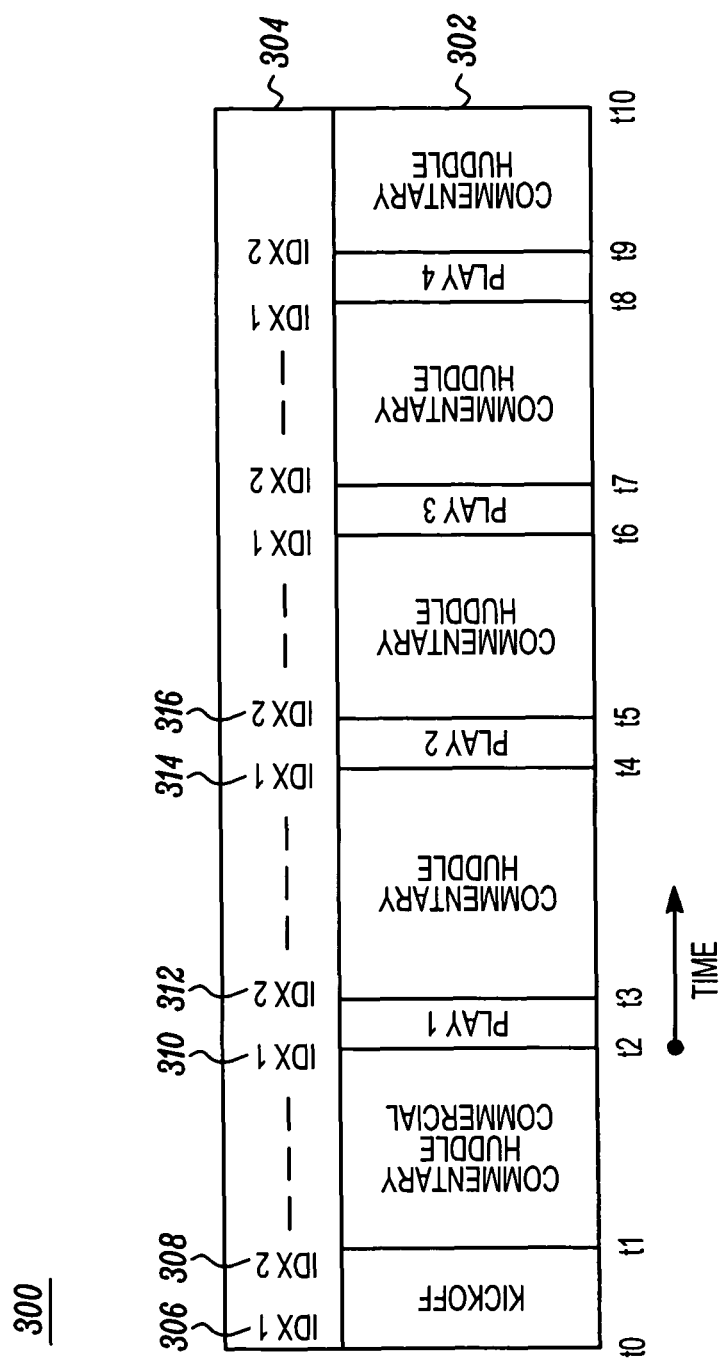
FIG. 3 shows an example of how a multi-media program can be indexed.

FIG. 3 depicts a recordation of the data of a multi-media program onto a tape, DVD, magnetic disk or into a semiconductor storage media 300 such as a random access memory (RAM). Both audio and video are recorded in a first track or signal 302. A second track or signal 304 is synchronized to, linked to or associated with the multi-media program material in the first track 302 such that markers or indices 306, 308, 310, 312, 314, 316, etc., are recorded in the second track 304. The indexes mark the beginning and end of different program segments recorded in the first track 302 and can be embodied as one or more files stored across one or more tracks and/or sectors. The indexes can also be embodied as one or more identifiable data values that are embedded in data in RAM and which represents the program material.

On a tape, a second track 304 can be physically adjacent to the first track 302, storing the indices 306, 308, 310, 312, 314, 316, etc. which by their location, mark the beginning and/or end of different program segments recorded in the first track 302. On a DVD or magnetic disk, the indices 306, 308, 310, 312, 314, 316, etc. can be embodied as data values or files, embedded into the program material by being recorded across one or more sectors. The indices can be pointers to one or more files, the contents of which specify locations in a memory device where segments begin or end.

As shown in FIG. 3 two different indexes, IDX 1 and IDX 2, are used to mark the beginning and ends of segments respectively. A first index "IDX 1," the first occurrence of which is identified by reference numeral 306, is recorded in the second track 304 and marks the beginning of a kick-off segment of a football game at time t0. A second index "IDX 2," the first occurrence of which is identified by reference numeral 308 and which is also stored in the second track 304 at t1, marks the end of the first segment. A second occurrence of the first index "IDX 1" is located at t2 and identified by reference numeral 310. This second occurrence of IDX 1 identifies both the end of the second segment and the beginning of the third segment.

As shown in FIG. 3, the program material stored on the media 300 between the index identified by reference numeral 308 and the index identified by reference numeral 310 is not game action and could include such things as commentary, commercial messages, shots of the fans in attendance or goings-on on the field. At time t2, which is the beginning of the first play of the game, the second occurrence of the first index "IDX 1" 310 marks the beginning of the first play after the kick off. A second occurrence of the "IDX 2" and which is identified by reference numeral 312, marks the end of the first play at time t3.

At time t4, another occurrence of the index "IDX 1," which is identified by reference numeral 314 marks the beginning of the second play of the game. Another occurrence of the index "IDX 2" at time t5 and identified by reference numeral 316 marks the end of the second play. Program material stored on the media 300 between t3 and t4 is not actual game action and might include commentary, commercial messages, shots of the fans in attendance or goings-on on the field.

As can be seen above, an index can mark both a beginning of one segment and the end of another. Although the indexes discussed above are described as marking the beginning and ends of segments, indexes can also be placed within segments so as demarcate sub-segments. With respect to the football game example, indexes could be placed within a segment to mark when a particular player, the quarterback for example, holds the ball. Indexes can also be used within segments for other marking purposes.

As shown in FIG. 3, indexes can be placed onto a storage media, on an adjacent track for instance. A segment of interest can be played back while a processor scans or reads the media on which the program is recorded, looking for indices that mark other segments. Upon detecting an index, a processor can examine the index to determine if the segment it marks should be played back or skipped over.

Figure 12:
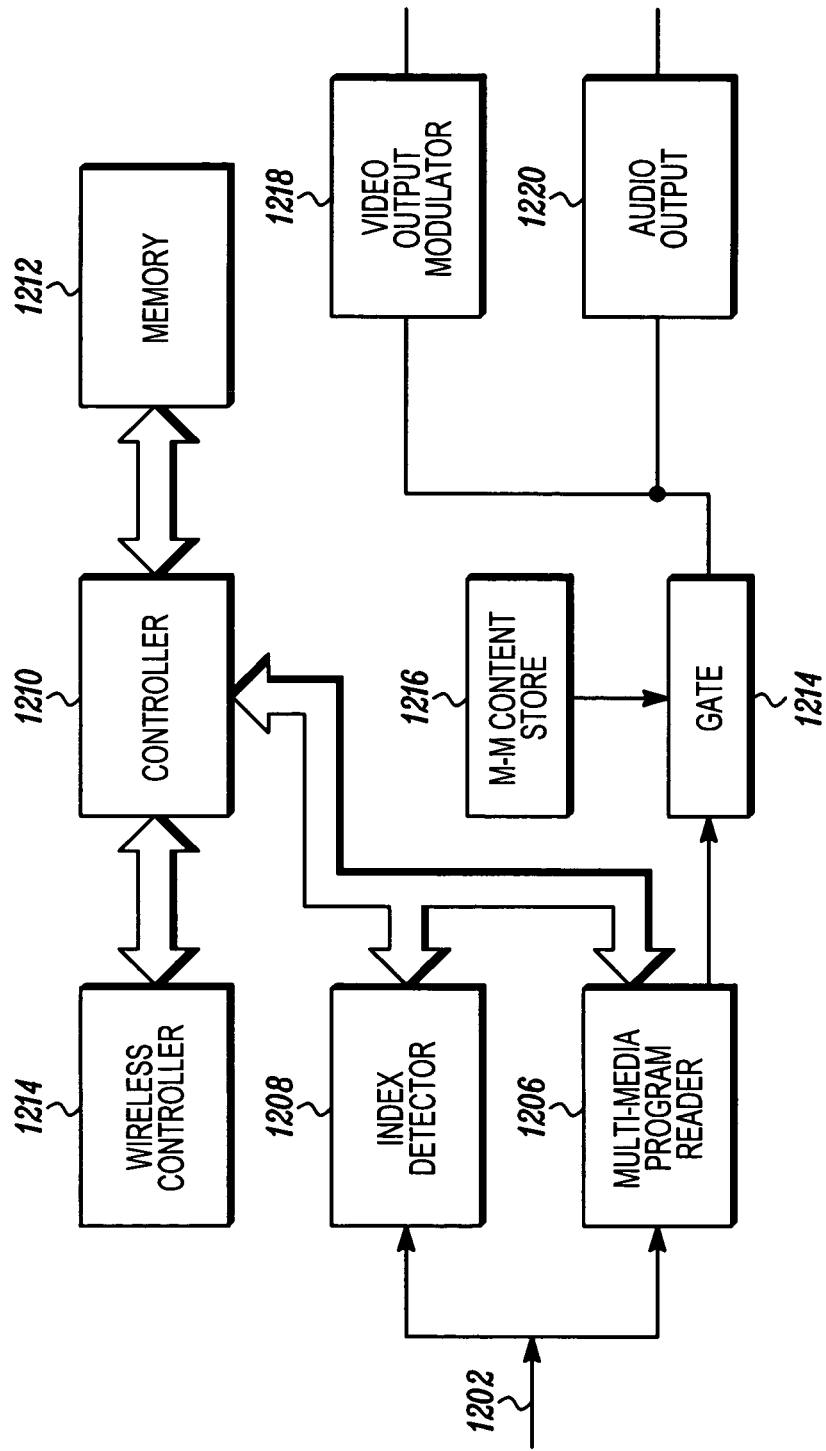
FIG. 12 is a block diagram of a playback unit.

Indexing multi-media program material to mark where particular segments begin and end, enables automated and selective review of contents segments according to various criteria of a viewer, and to determine if the indexes convey information that identifies various criteria. A multi-media program that is augmented by indexes (also known as having "indexed" or "marked" segments) can be selectively reviewed in segments according to the indexes that identify segments having content that conforms to a user's specification. Segments that do not satisfy a viewer's criteria can be skipped over, i.e., "suppressed." By marking different segments with one or more appropriate markers, an appropriately-capable playback unit such as depicted in FIG. 12, can playback program material segments that are marked and which conform to a user's criteria, selecting only the segments the markings of which conform to a user-specified criteria and suppressing the playback of segments that do not conform. Such a playback unit can make the playback of user-selected content appear to be almost seamless: as one scene of a movie ends, another scene of the movie immediately begins, with both scenes being of interest to the viewer. By recording the multi-media program material in an appropriately-capable storage media and with an appropriate format, scanning multi-reading the media program for indices or causing the playback unit to jump to the next conforming segment enables a selective playback without user intervention. Scanning high-speed storage media for indexes is readily accomplished by way of a processor, combinational or other hardwired logic in negligible time.

Figure 4:
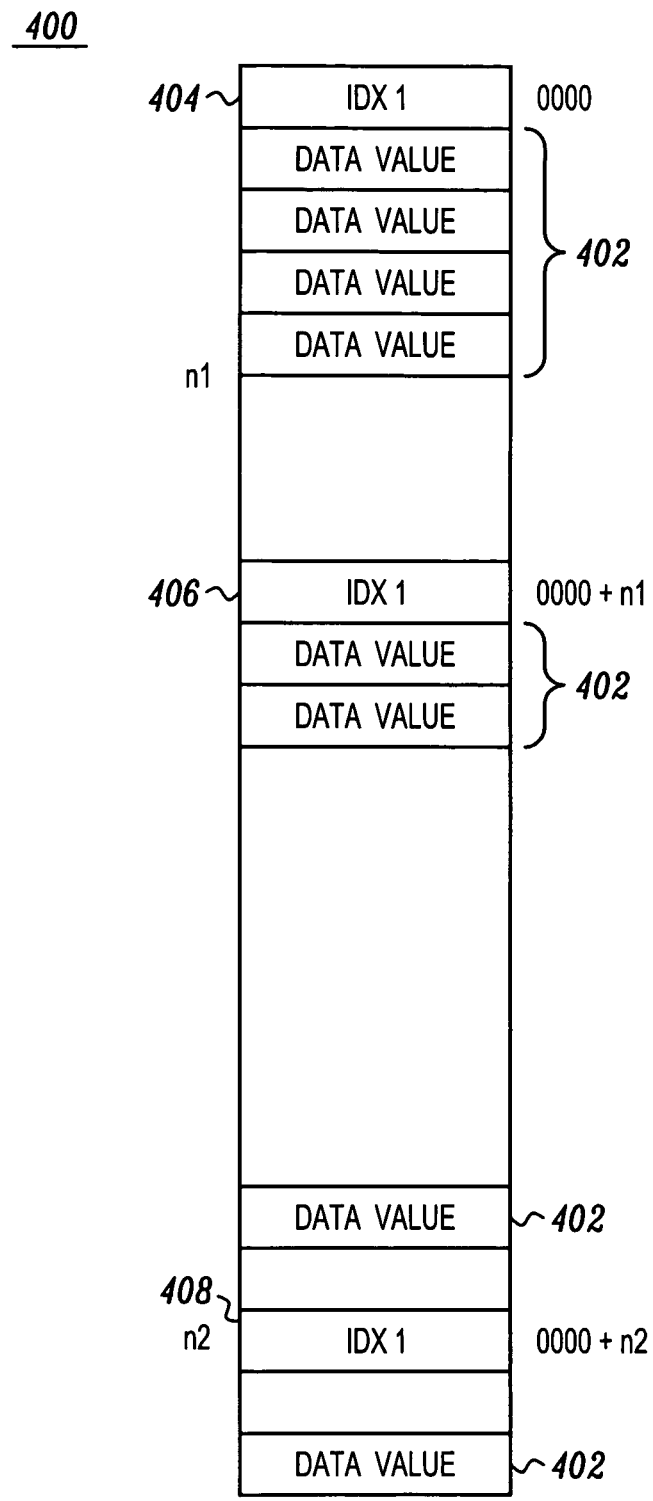
FIG. 4 shows how the data of a multi-media program can be stored in a computer memory device or on a storage media, with included indices.

FIG. 4 depicts an example of the organization of a data structure or file 400 of computer data values 402, as they could be stored on a CD, DVD, a magnetic tape or magnetic disk, or in the random access memory (RAM). The storage media is accessible to a controller of a playback unit, such as a microprocessor, microcontroller, digital signal processor or even combinational/sequential logic. The data 402 stored in the file 400 represent a portion of a multi-media program.

As shown in FIG. 4, data values that represent program material are stored in separate, memory locations, numbered "0000" through at least "0000+n2" where n2 is a number of locations offset from location 0000 As a controller reads out each value from a memory location, it is used by a playback device to re-create a multi-media program—unless the value read from memory is an index.

FIG. 4 shows three indices interleaved with the data values 402, i.e. stored within the multi-media program data, are indices, which are identified by reference numerals 404, 406 and 408. That the indexes are embedded within data that comprises the multi-media program enables them to mark exactly where a segment begins and/or ends without ambiguity. The indices 404, 406 and 408 are not program material and only mark or identify exactly where different segments (comprised of the data values 402) begin and/or end in the storage media 400.

By using appropriately high-speed storage media, the time required to sort through program data values 402 to identify indices can be made negligible. One segment can be played back by reading out data values while data values ahead of what is being played back are tested to determine if they are indexes and if so, whether the segments they mark conform to a user-specified criteria. As set forth above, indices can contain much information by which the content of a segment is identified. Segments that do conform or don't conform can be identified well in advance of the conclusion of the play back of conforming segment is ended, thereby causing the multimedia program play back to be interrupted.

In FIG. 4, a first occurrence of an index IDX 1 is identified by reference numeral 404 and is stored at memory location (address) 0000. In FIG. 4, the first occurrence of IDX 1 marks the beginning of a first segment of multi-media program material. Data values 402 following the first index IDX 1 up to the second occurrence of the index at reference numeral 406 represent another segment of multi-media program material that conforms to at least one criteria. Data values 402 stored in sequential locations in RAM enable an appropriately-capable multi-media playback unit to play back program material segments according to various criteria. Segments can be identified by different indices.

If the segment of a program that is represented by the data values between the first and second occurrences of IDX 1, conforms to a user-specified criteria, the segment that those data values represent can be selectively played back to a viewer. If they don't conform, they are not played back.

Immediately following the second occurrence of IDX 1 at reference numeral 406 is a second series of data values 402, which are followed by a third occurrence of index IDX 1 that is identified by reference numeral 408. If the segment of a program represented by the data values following the index identified by reference numeral 406, conform or don't conform to a user's criteria, the portion of the program between indexes at 406 and 408 can be either jumped over, i.e., suppressed or played back. In other words, if a user's specification to play back certain content is a "first criteria" a first program segment can be played back on the occurrence or detection of the "first criteria." A second program segment can be jumped over on the occurrence or detection of any other criteria that doesn't conform to the first criteria, i.e., a second criteria. A third segment can be played back on the re-occurrence or re-detection of the first criteria or a third criteria.

Depending on the content of the indexes at each occurrence of IDX 1, they can be used to determine whether content in the data bytes adjacent to them conform or do not conform to a user-specified criteria.

It will be appreciated by those of ordinary skill in the electronic arts that the indices "IDX 1" can each be comprised of different-valued or special-valued data bytes. They can each also be comprised of multiple bytes of data, or even small files, the contents of which can identify the location of a segment on a media; the contents of a segment, e.g., is a segment of a movie an action scene or a love scene; does it depict a particular persona, message or idea; the importance or interest of a segment; the start time and/or stop time of a segment and/or the sequence or order of a segment relative to others. The content of the IDX 1 indexes can identify the location of a segment on a media; the contents of a segment; the importance or interest of a segment; the start time and/or stop time of a segment and/or the sequence or order of a segment relative to others. With respect to the aforementioned football game, one value of an index IDX 1 can indicate the start of a play, or a type of play, as well as possibly the length of time of a play segment. For instance, a second value of index IDX 1 can indicate the start of a running play while a third-valued index IDX 1 can indicate the start of a pass play. A fourth-valued index IDX 1 could indicate a particular camera used to capture goings-on on the field or perhaps in the stands. By "looking" through program data for indices, it is possible to view only the portions of a multi-media program that satisfy certain criteria, as determined by the content of the indices.

By indexing a multi-media program and storing the indexed program material in an appropriately fast storage device, locating the markers or indices 404, 408, 410 becomes a task of reading the data and sorting and/or scanning data values 402 until an index is found. When an index is located, ensuing multi-media program material can be selectively viewed or skipped over, based on whether an index identifies subject matter that satisfies one or more viewer-specified criteria. Viewer-specified criteria can thereby effectuate control over multi-media playback by determining whether or not certain program material should be viewed or skipped over.

An index or marker for a segment can contain characterizations of subject matter and other attributes of a segment including, but not limited to, where a segment starts and/or ends; the time duration or media length of the segment; the pace of the content; the pace, style and/or mood of the content subject matter; the owner of intellectual property rights of the segment or fractional part of a program, by which the segment's owner can be compensated for playback of the segment, or billed, in the case of playback of a commercial message in a segment. For instance, playing back a segment that is a movie or part thereof could give rise to a fee or royalty to the copyright owner whereas playing back a commercial announcement would more likely give rise to a fee due from the advertiser instead of a royalty payment.

Those of skill in the art will recognize that indexing a program so as to be able to jump over or skip portions of it without adding any intervening material between the played segments necessarily requires the indexed program to be stored on a media that can be advanced or which allows a playback device to read through program material until it finds an index or indexes. Program material broadcast from a television station or via a cable does not allow the recipient to control the playback rate and would therefore be unable to provide for skipping over unwanted content. In instances where the source of multi-media program material is not stored on high-speed media, or instances where a viewer prefers transitions between segments, content can be added between segments as described more fully below. In order to be able to selectively playback program segments without waiting requires program material to be pre-recorded and indexes to be added prior to playback.

Multi-media program material can be indexed by manually reviewing program material and appending or linking to the beginning, inserting or otherwise marking where segments begin and/or end. Indexing a program will typically require manually reviewing and marking a program but indexing can also be performed automatically, such as by programming the recognition of subjects captured by a camera, detecting a particular camera angle or by detecting certain sounds.

Manually reviewing a multi-media program and inserting indices can be performed according to subjective or objective criteria. Examples of objectively indexing would include indexes that mark the beginning or end of a play of a sporting event such as the aforementioned football game. By virtue of the game's rules, the beginning and end of a play are well defined. Indices can also be objectively inserted upon the detection of an audio signal, such as crowd noise or the referee's whistle during a game. An example of a subjective index would include indices that identify where a person appears in a movie, where an event is depicted, a subjective "mood," a theme, an importance of a scene or scenes, or subjects depicted in a scene, etc. Once indices are added, detecting their presence or location can be used to select certain segments for playback, thereby controlling the time required to review the multi-media program material.

Although FIGS. 3 and 4 depict single indexes being added along the length of a program, alternate embodiments would include inserting multiple indexes as well. Instead of inserting a single index, two or more indexes can be added serially, with each index marking a different criteria by which a segment can be selected, thereby allowing the same program segment to be selected by using different criteria.

Figure 5:
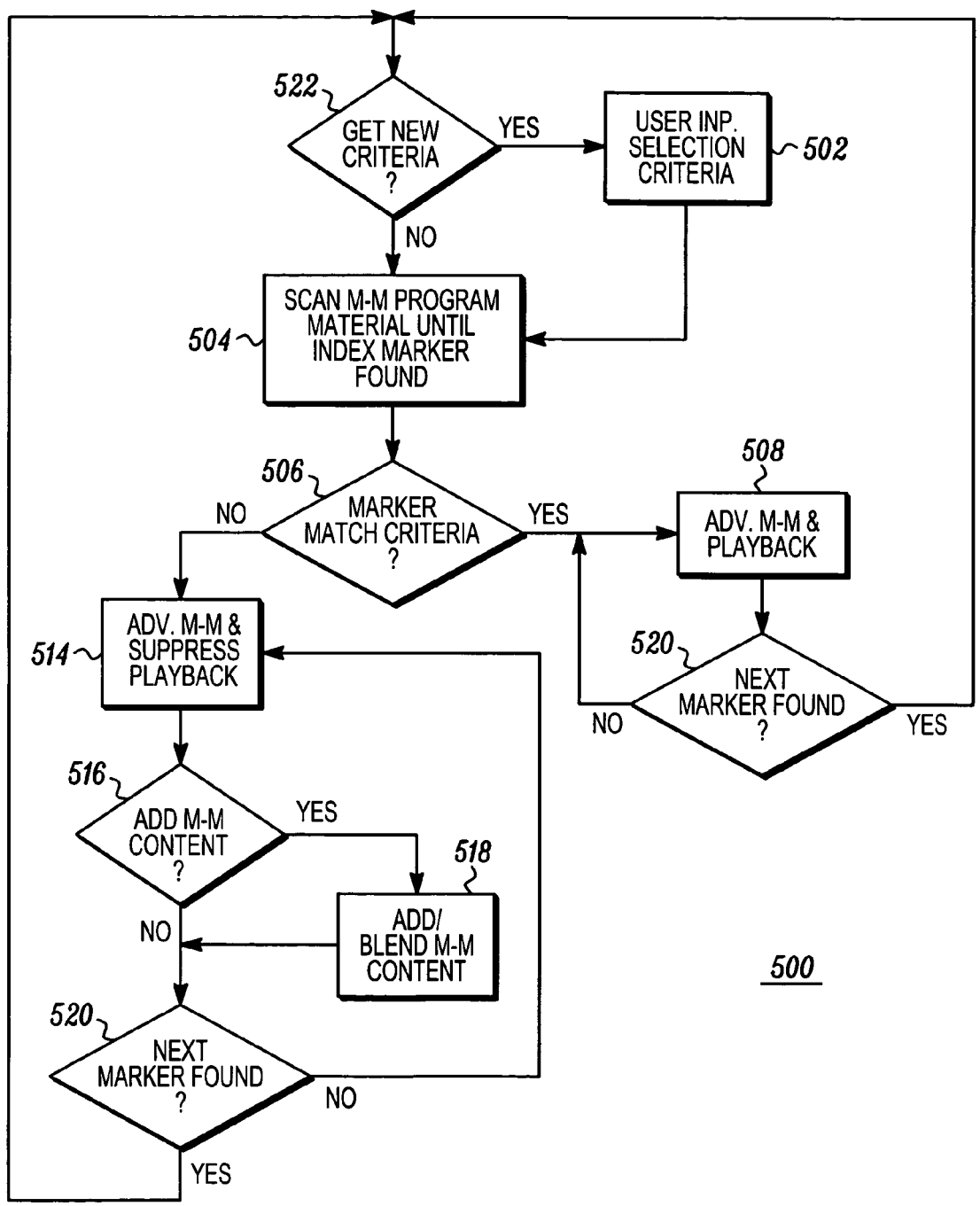
FIG. 5 depicts a method by which the time required to review a multi-media program can be controlled.

FIG. 5 depicts steps of a method 500 by which segments to play back can be selected and the time required to review multi-media program material can therefore be controlled. In the method, a criteria by which segments selected for playback is received at a playback device (not shown in FIG. 5) at step 502. Examples of segment selection criteria include (but are not limited to) action or inaction of a sporting event; an event depicted; the quality of content depicted; the mood of the content depicted; the subject depicted; the style of the content; contemporaneous or non-contemporaneous sounds; a person or persons depicted; a person's voice; a camera or camera angle at which an event is captured; whether the information is color or black & white; in instances where several streams of information are available simultaneously, the depiction, content or annotation of any stream; annotations of a segment, and so on.

In step 504, multi-media program material, which is preferably stored in RAM, on magnetic disk, DVD or other high-speed storage media, is scanned until an index or maker is located. Inasmuch as multiple markers might be used, each of which identifying different-content segments, at step 506 a determination is made whether a marker that is found in, or with multi-media program material, corresponds to the user-criteria specified in step 502. Correspondence of an index detected in step 506 means that at least one segment satisfies a user's first criteria for viewing the multi-media segment.

If at step 506, an index indicates that the multi-media program material it marks, corresponds to the selection criteria established in step 502, the multi-media program material is played back, at step 508, and by way of the program loop 508-510, until the next marker is found in step 510.

As set forth above, sub-segments can also be marked within a segment. In step 506, a determination is made whether a sub-segment marker conforms to a subject of interest or a user-specified criteria. Multi-media program continues to be played back at step 508 until the conclusion of the marked program material occurs.

If an index is found in the multi-media program material during step 506 but the index indicates that the multi-media program material does not conform to a user criteria, program flow proceeds to step 514 where the multi-media program material is not played back on an output device but is instead suppressed or skipped over, preferably by jumping over unwanted content segments.

A feature that is enabled by the selective playback of only program segments that conform to a user-specified criteria is the insertion of new multi-media content between the playback of conforming segments, especially if conforming segments are temporally spaced by large amounts of time. Such new material can be user-specified or content-distributor specified. In step 516, a decision is made whether to add additional multi-media content while searching for an index. If multi-media content is to be added, as shown in step 518, the new content is added until the next index is located in step 520 or the program material is exhausted.

By way of example, during the time required for a processor to sort through the data values 402 stored in memory, all of which represents multi-media program material, new commercial advertising, personal interest graphics, music, audio or other multi-media content can be added and displayed for a user while the processor searches the stored multi-media program material for the occurrence of the next marker.

In a preferred embodiment, users can change segment selection criteria. A test is implemented at step 522 whereat a reviewer or user can specify a different selection criteria. If no input selection criteria is input, program control proceeds to step 504 where the program material is scanned again for the next occurrence of a marker or index. Alternatively, if a new index is wanted, it is selected at step 502.

In the foregoing method, indexes mark where segments nominally begin and end. Those of skill in the art will recognize that there is no particular reason why playback must start or end precisely at an index. Indeed, the amount of material played back can be incrementally increased or incrementally decreased, and hence the time required to review a program can be incrementally increased or incrementally decreased, by incrementally moving up or back, the beginning of the playback of a segment. For example, in FIG. 4 the time required to view a multi-media program could be reduced by ignoring at least some of the data values 402 before or after an index 404, 406 or 408. Conversely, more program material could be played back by locating an index marking a segment and then reading data ahead of the index so as to include more content.

In the method shown in FIG. 5, the amount of program material of a segment to be played back can be adjusted by being increased or decreased by an index offset count. In embodiments where the multi-media program is data that is stored in memory and indexed so that the segment starting and ending addresses are determinable, the playback of a segment can be more closely controlled by adjusting the point in memory, relative to an index, where playback begins and/or ends. That is to say, less content can be played back and the playback time reduced by beginning the playback in either step 508 or 520, a predetermined number of data locations, before or after the location of an index, can be added to or subtracted from the location of where an index is at so as to control playback time. In other words, the amount of program material to be played back can be decreased by deleting data after the location of an index or increased by playing back data ahead of an index. By adding or deleting content on either side of an index (or all indexes) a viewer can precisely adjust the amount of time required to view a program.

An offset in either steps 508 or 520 can be implemented as an additive or subtractive index value by which a controller for a playback unit would be controlled to begin a segment playback either earlier or later than indicated by the index itself.

Figure 6:
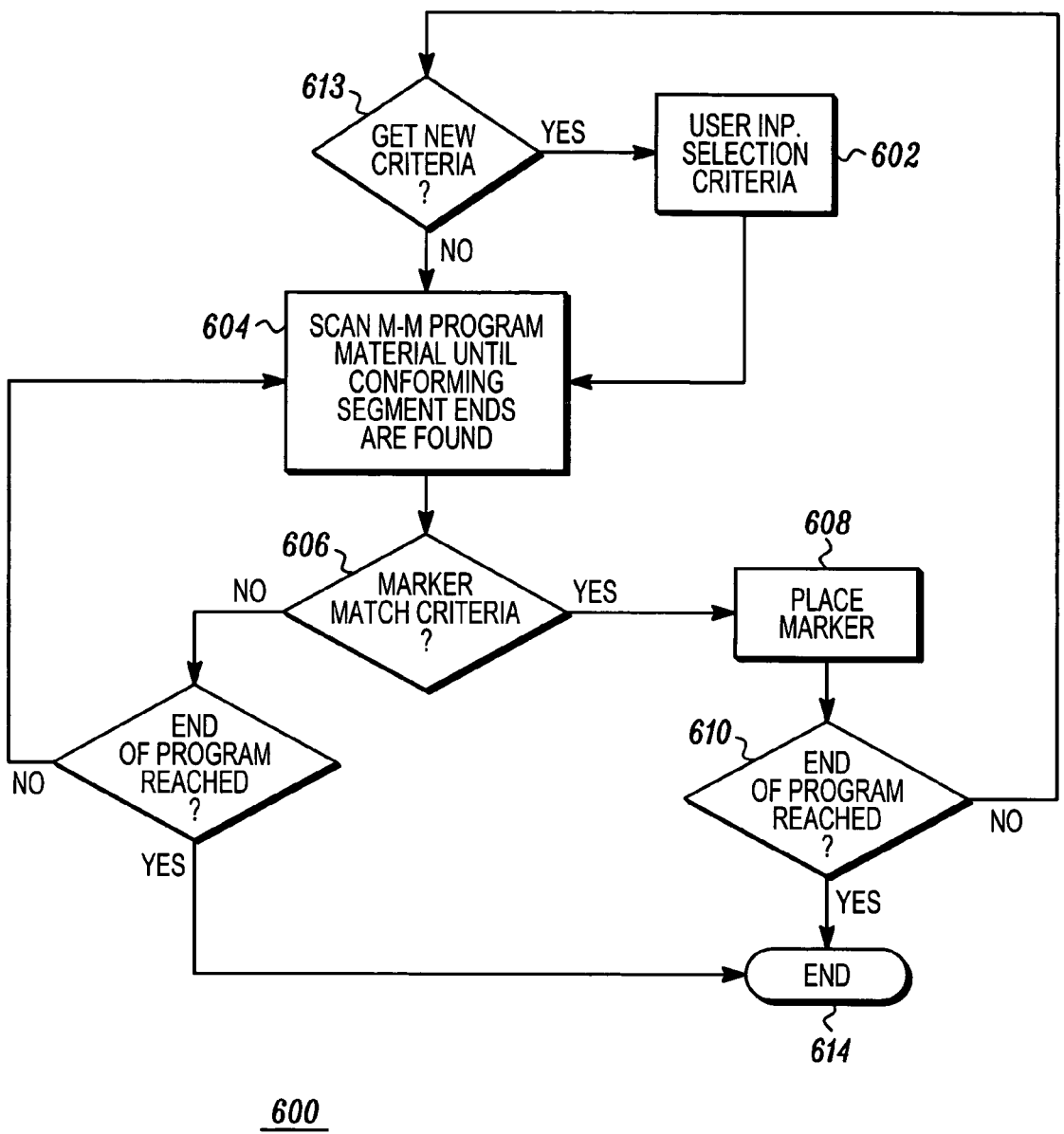
FIG. 6 shows steps of a method by which multi-media program material can be indexed.

FIG. 6 shows a flowchart of a method by which multi-media program material can be indexed, segment by segment based on various criteria. The method 600 depicted in FIG. 6 is intended to be implemented using a manual review of multi-media program material by a screener or other person specifically tasked to review multi-media program material and mark the beginning and ending of particular program segments according to specifications or other criteria.

In step 602, a specification or criteria is received by the observer or screener by which segments can be identified. Examples of selection criteria are set forth above.

In step 604, the multi-media program material is reviewed, frame by frame if necessary, until subject matter, information, actors, the camera angle, a particular scene or scenes, or other information in the multi-media program is detected or identified and which matches the selection criteria specified in step 602. In addition to marking the beginning and/or ends of segments, indexes can be added within segments as set forth above, for other purposes, such as a demarcation of when an event or idea is presented.

In step 606, upon the determination that a segment that has the content satisfying the first criteria is identified, a marker is placed at step 608, thereby identifying at least one of: the beginning of the segment; the end of the segment or the length or location of the segment, that satisfies the criteria specified in step 602.

In step 606, if no content is located, another test is performed at step 612 to see if the end of the program material has been reached. If not, program control loops back to step 604 until a segment is found. If the end of the multi-media program material is reached, the marking process ends at step 614.

In step 610, a test is made if the program material end has been reached and if not, program flow returns to step 613 where a decision can be made whether to change the input selection criteria.

Figure 7:
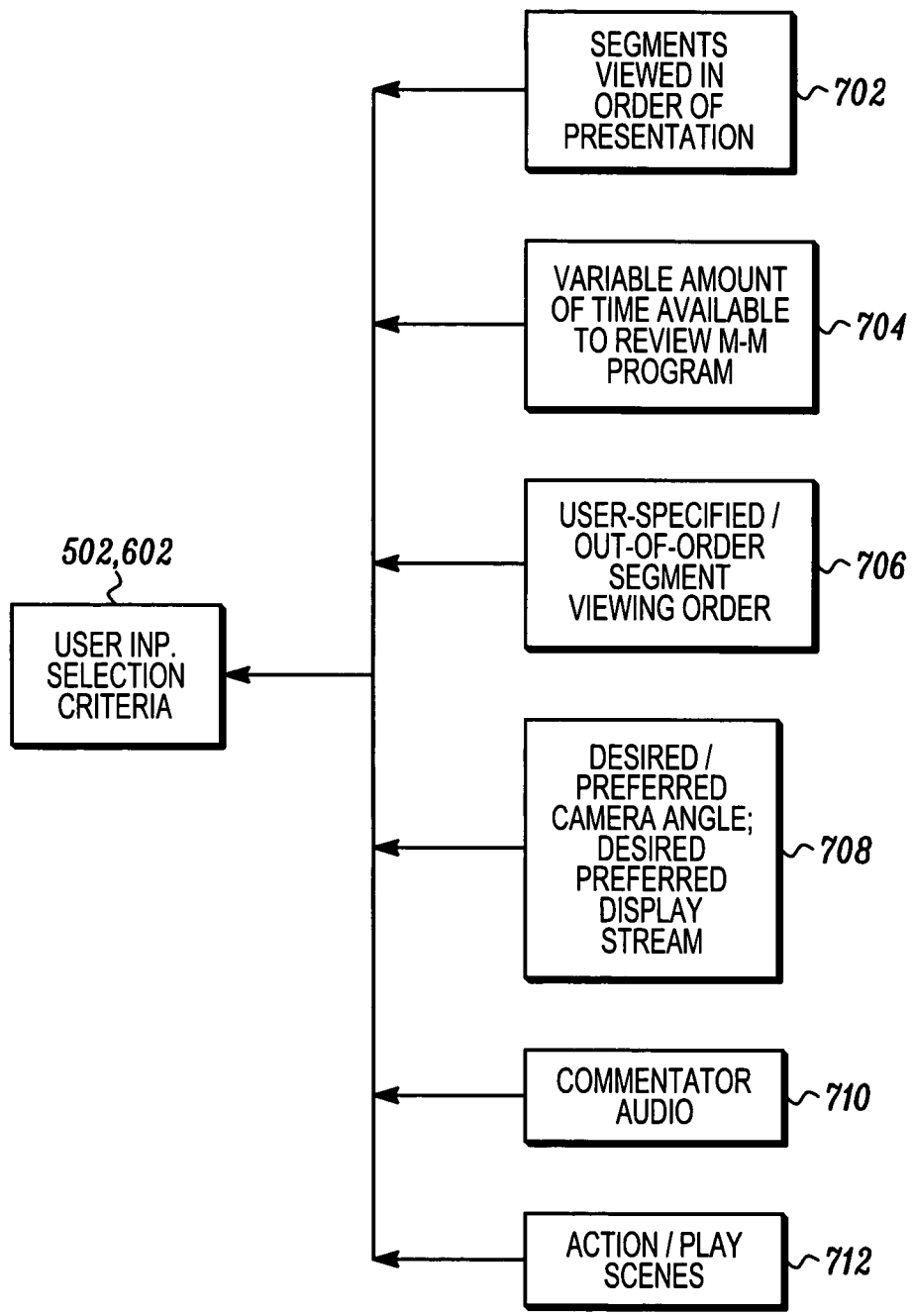
FIG. 7 shows input selection criteria by which segments can be selected for playback.

FIG. 7 depicts the input selection criteria 502 of FIG. 5 or 602 of FIG. 6 and can include many different criteria. Segments can be selected for playback in a particular order 702, such as by a numeric ordering of segments. In most instances, segments will be played in the order in which they are recorded on a media with a first segment followed by a second segment; the second segment followed by a third segment. Another example criteria would be to review segments, the playback time of which can be varied 704, such as the segments of a football game between plays. Yet another example criteria would be to view segments in an out-of-order viewing sequence, specified by the user 706, such as reviewing a second segment on a media prior to reviewing a first segment. Another example criteria would include reviewing an event that was captured from a particular camera angle 708, such as the end-zone camera of a football game. Segments could be selected as those of a particular stream of multi-media content programming, such as all of the content captured by a particular camera 708, regardless of what is captured by it. A commentator's audio 710 can also be a criteria by which a segment is selected. Action scenes or other types of scenes 712 can also identify a segment. Alternatively, the segments can be selected from all those in a program to be those which allow the entire program material to be viewed in some predetermined amount of time which the reviewer wishes to spend reviewing the program material.

Figure 8:
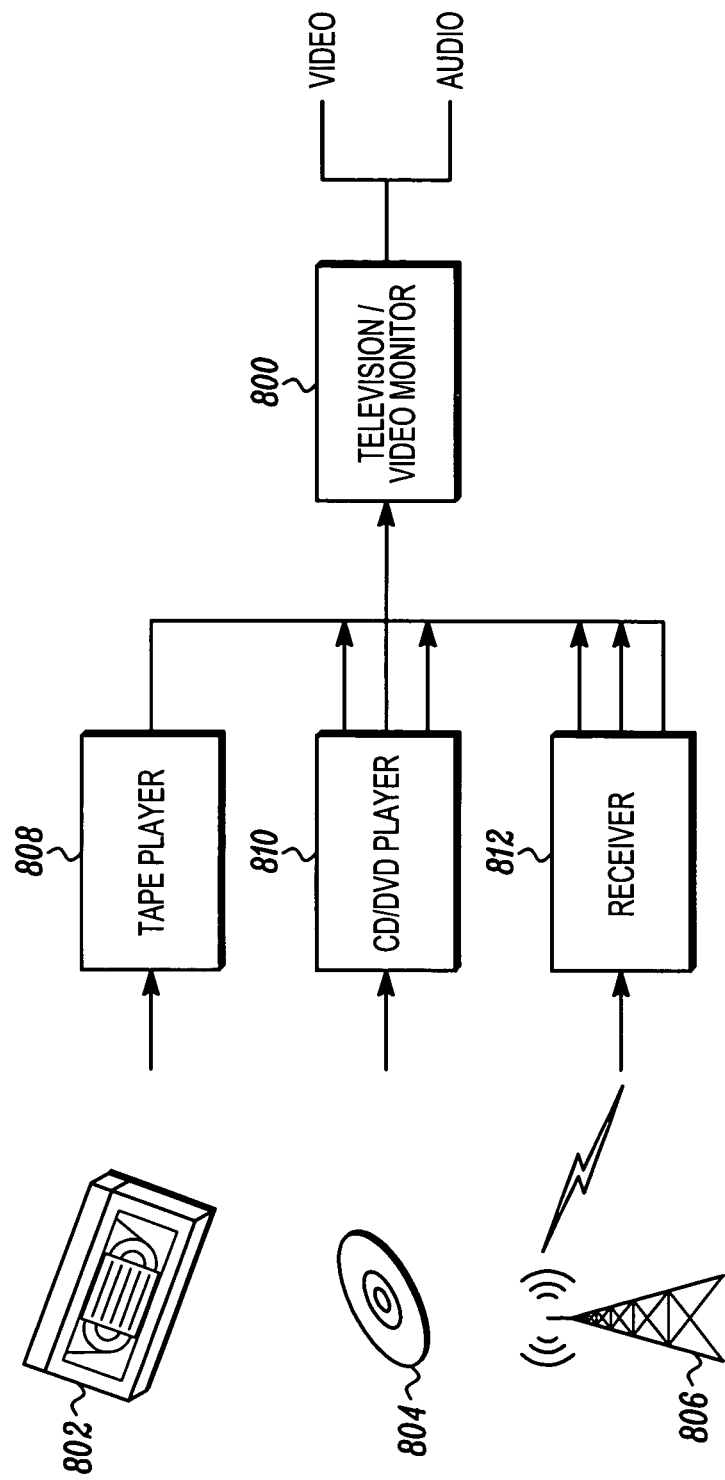
FIG. 8 shows a system by which the time required to review or playback one or more multi-media program streams can be controlled.

FIG. 8 depicts a television or video monitor 800 into which multiple streams of multi-media program material are input from various indexed-multi-media playback devices 808, 810 and 812. As shown, these playback devices receive indexed multi-media program on various media on which indexed program material is recorded and from which, indexed multi-media signals are output to a display device such as the television or video monitor 800. The physical media on which streams of indexed multi-media can be transmitted and/or recorded include tape 802, a DVD 804, as well as a radio-frequency broadcast signal 806, fiber optic cable (not shown but well-known in the art) and a data network (not shown but well-known in the art). The content ultimately viewed by the user may be composed of segments selected from multiple streams. In instances where content is streamed from sources such as a broadcast channel or on a slow media, suppressing segments can cause a complete loss of multi-media playback. In such an event, other multi-media content can be added or overlaid and played.

One way of broadcasting multi-media that includes indices would include data networks such as the Internet. Those of ordinary skill in the art of computer networks know that multi-media signals such as streaming audio and video files can be sent over a data network as streams of data packets. Indeed, video and audio streams including voice-over-IP telephone calls are now routinely transmitted via the Internet. Indices can be embedded in such data streams with ease.

In instances where multiple streams of multi-media program material are input to a playback device 800, it is desirable to be able to select at least one stream of multiple streams for viewing, based on indices or markers that might be present in a particular stream. In the embodiment of FIG. 8, multiple, multi-media streams or content files could originate from media that also includes, but is not limited to, a single tape 802, a single DVD, 804 or a single broadcast signal 806, a fiber optic cable over which one or more data streams can be transmitted on a data network. Any one or more streams could be selected by the indices embedded in each of the streams.

Indexed multi-media program material carried on any one of the above-identified media is considered to include analog and digital representations of video, audio, graphics, or any combination thereof, various different segments (portions) of which are marked or identified (i.e., indexed) by any appropriate mechanism according to what is depicted, who is depicted, the subject depicted, a mood depicted, a camera angle, an audio content of the program segment.

Figure 9:
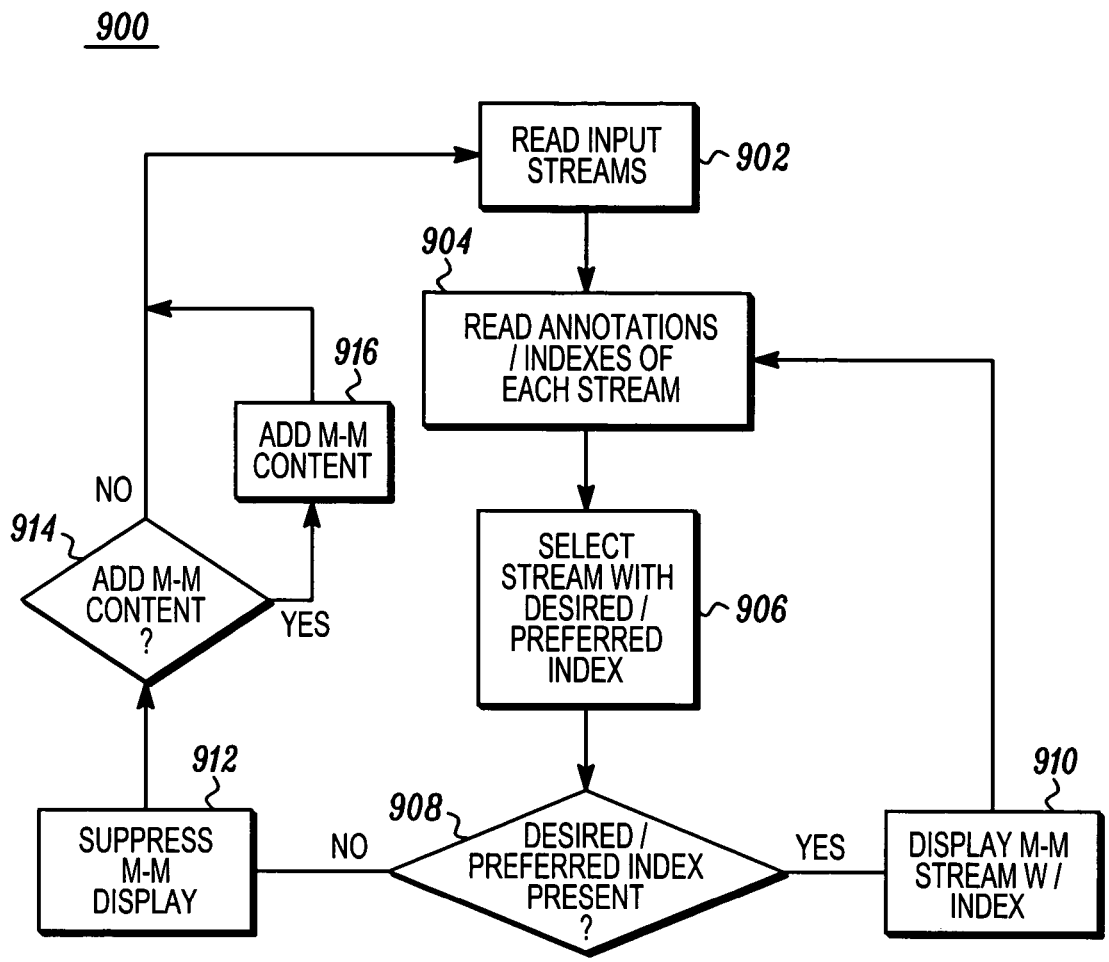
FIG. 9 shows a method for selecting a stream of multi-media information from many such streams.

FIG. 9 shows a method for a playback unit to select a stream of multi-media information from many such streams. In step 902, one or more input streams are read such that indices in each stream can be detected in step 904. Indices that identify or which include annotations are preferably added such that the annotations are played back or displayed substantially contemporaneously with the program material to which they pertain. Presuming that a predetermined index or annotation was specified by a user, the indices detected in a stream are evaluated at step 906. In step 908, a decision is made as to whether a desired index or a particular type of segment is present in the stream. If a desired index or a particular type of segment is detected, the stream segment is played back in step 910 on a playback device such as a video monitor or receiver 1000 depicted in FIG. 10. Alternatively at step 908, if none of the streams have a desired index or a conforming segment, multi-media display is suppressed in step 912.

In the event that multi-media display is suppressed, a decision can be made in step 914 to add multi-media content in step 916 for display to a viewer. In embodiments where the multi-media content is provided from a fixed-rate source, such as broadcast channel, a user might find it preferable to add other content. In such embodiments, the content to be added can be selected to be able to fill variable amounts of time.

As set forth above, suppressing multi-media program material pending the detection of a segment satisfying a viewer's selection criteria can cause program material to drop out. On such events, it is possible to overlay or interleave other multi-media content for presentation to the viewer. As shown for example in step 914 depicted in FIG. 9, it is possible to add multi-media content if no segment of a program satisfies a user's criteria. In such a case, it is possible to blend or merge advertising material, personal graphics or video, music or other multi-media content for display.

The decision of step 916 can consider the amount of time that is required to read ahead to find an acceptable segment. If content is to be added, it is done so in step 916. If no multi-media content is added, program control can be returned to step 902 to continuing the monitoring of each of the input streams. In an alternative embodiment of the invention that adds content between segments, added multi-media content can be displayed on either a display device such as a television or video monitor, or a controller.

Figure 10:
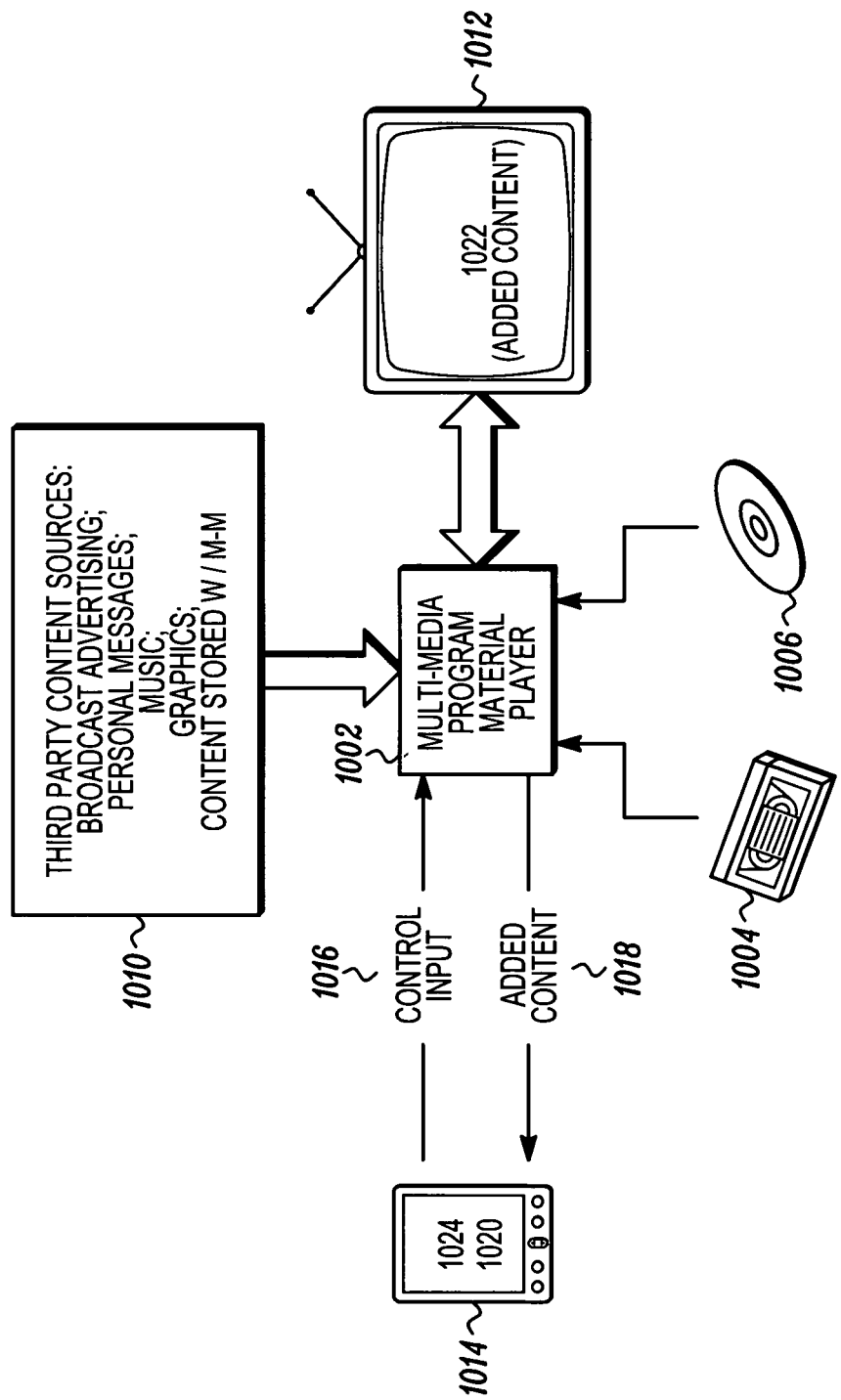
FIG. 10 depicts a system for controlling the time required to review or playback multi-media content.

FIG. 10 depicts a system 1000 by which indexed multi-media program material can be reviewed to skip unwanted segments and thereby control the time required to review multi-media program material. A multi-media playback unit 1002 (described in more detail below) receives indexed, multi-media content from a variety of sources such as a tape 1004, a DVD 1006 or a broadcast signal (not shown). The playback unit 1002 can also receive indexed, third-party multi-media content 1010 such as advertising or personal messages, indexed music, graphics or other indexed content that might be stored either inside the playback unit 1002 or delivered in real time from another source such as broadcast channel. Output of the play back unit 1002 is displayed or otherwise played back on a multi-media monitor 1012.

As described more fully below, third-party multi-media content 1010 can be used to provide overlaid multi-media as described in FIG. 13A-13E. Third-party content can be displayed on either a monitor device 1012 or perhaps a multi-media enabled remote controller 1014 for the monitor 1012.

Control signals 1016 from the remote 1014 can be input to the playback unit 1002 that instruct the playback unit to search for multi-media segments in the multi-media program material 1004 or 1006 that satisfy one or more criteria. In a preferred embodiment, the multi-media playback unit 1002 will search for content segments in the indexed multi-media program material 1004 or 1006 that satisfy a user's criteria and suppress all other multi-media program material that do not satisfy the criteria.

Instead of presenting a blank screen on the television or video monitor 1012, the playback unit 1002 can optionally present other multi-media content 1010 such as targeted advertising, personal messages, music, graphics or other content which can be stored locally or delivered to the playback unit 1002 and the data network or broadcast. Various methods of playing back third-party content can effectuate different playback experiences, as set forth more below with respect to FIGS. 13A-13E.

In an alternate embodiment, using any appropriate wireless transmission protocol and a multi-media display device with a remote controller, third-party content can be displayed on either the remote controller 1014, for display thereon or on the monitor 1012. In a preferred embodiment the remote controller 1014 can be configured under software control in a way that is consistent with the multi-media program material being played back. For example, the remote controller 1014 can be remotely configured so that the functionality of keys or touch-sensitive areas on the remote controller matches subject matter played back on the playback unit. By custom-configuring the remote controller, it's actuation can be made to correspond to the multi-media program of material being played back. For example, during the playback of a football game, softkeys or control buttons on the playback unit 1014 can be configured under software control so that their functionality provides inputs signals to the playback unit, instructing the playback unit to skip to a first down, a fourth down, or to a particular type of play, or to a half-time show. When used to playback a baseball game, the controller 1014 functionality could be modified such that the same soft keys or control buttons allow a user to skip to the next batter, the next hit or the next home run that occurred during the game.

Examples of third party content that can be displayed on the remote controller 1014 display screen 1020 includes advertising content, personal messages, music, graphics or other multi-media content from the playback unit 1002. And, as set forth below with respect to FIGS. 13A-13E, overlaid content can also be displayed on a display screen 1020 of a remote controller 1014.

Figure 11:
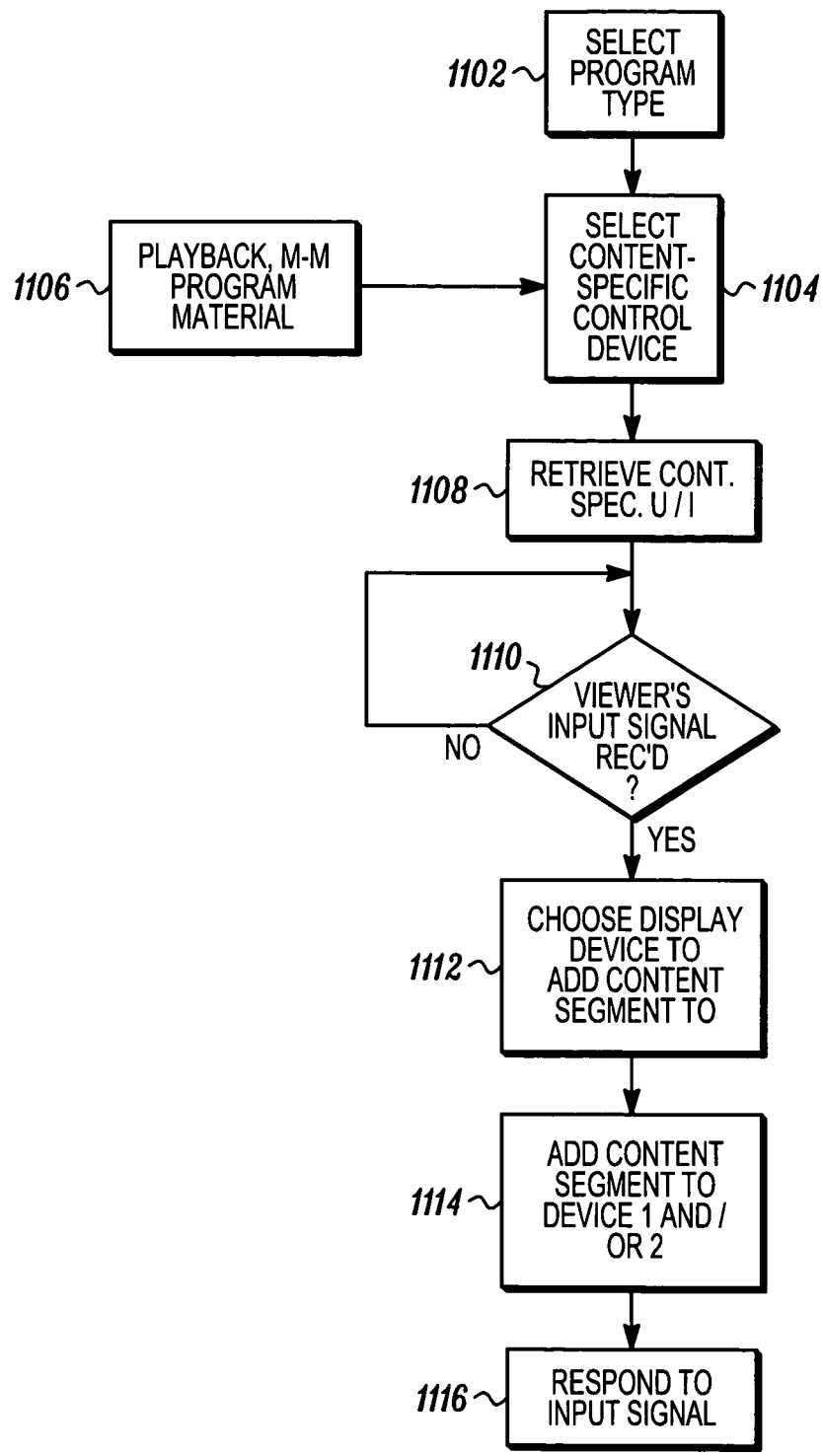
FIG. 11 shows the steps of a method by which multi-media content can be added during the suppression of program material.

FIG. 11 depicts steps of a method by which multi-media content can be added between segments to be played back and displayed on either the playback device or a remote controller for the device during the suppression of multi-media program material that does not comply with the user's specification or criteria.

In step 1102, a selection of the multi-media program type is made by a viewer. As described above, multi-media segments that conform to the selected program type will be played back; non-conforming segments will be suppressed.

In embodiments where a remote playback device is configurable and capable of displaying multi-media, instructions and/or data is downloaded into or pushed down into the controller in step 1104 so as to configure the remote control device 1014 to be specifically configured for the multi-media program material being played back. In an alternate embodiment, in step 1108, the remote controller retrieves or pulls data from the controlled, playback device in order to make the remote controller content specific.

Configuring a remote controller to be content specific requires transferring sending control signals and data to the remote controller by which software-programmable keys and/or touch-sensitive display areas are configured by the playback device 1002 to correspond to the type of multi-media program material being played.

Returning to step 1106, program material is played back for display on a video monitor or television. At step 1110, upon a user's input of a signal or command to a controlled device from the remote 1014, a decision is made whether a command signal from the viewer was received. Part of the decision of step 1110 is the decision to playback or add additional third party multi-media content, which can be performed on a display device 1012 or remote 1014.

In step 1112, the display device on which to display the added content is identified and the method of displayed is determined. In step 1114 the content is added during the suppression of multi-media program material or, in addition to the multi-media program material.

At step 1112, added content can be determined to be displayed as a banner or stream 1222 on the television monitor or as a stream or area of the display screen 1022 of the monitor 1012. The last step 1116 of the method is to respond to the user's input control signal, which might be change a channel, increase a volume, or decrease a volume level, speed up or slow down the display time on which to review program material.

FIG. 12 is a block diagram of a playback unit, such as the playback unit 1002 depicted in FIG. 10. Multi-media program content information 1202 is received at a program reader 1206. The program content information 1202 is sent to both a program reader 1206 and to an index detector 1208. Inasmuch as the content information 1202 can included embedded indexes, the detector can be embodied as a processor that reads incoming data to detect an index data value or values.

Both the index detector and the program reader are operatively coupled to a controller 1210, equivalent examples of which include a microprocessor, microcontroller, DSP or finite-state machines embodied using combinational and sequential logic. When an index is detected, its occurrence or the actual index content is sent to the controller 1210. A software programmable embodiment of the controller 1210 executes program instructions stored in memory 1212 as well as operating on data might also be stored therein.

Upon detection of an index by the index detector 1208 and transmission of the index information to the controller 1210, the controller signals a gate circuit 1214, the function of which is to either transmit multi-media program information 1202 or substitute therefore, multi-media content that might be locally stored or available from some other source 1216. Whether the multi-media content is from the reader 1206 or from other source 1216, the multi-media selected by the gate 1214 is delivered to the appropriate modulators 1218 and 1220 for presentation.

By using the foregoing methodology, it is possible to control the time required to review multi-media program material by electronically locating and playing only the segments of interest and electronically skipping over segments of no interest. In suppressing unwanted segments and playing only segments of interest as a concatenation of segments, the playback experience might occur too quickly because segments appear too close together.

Some users might prefer that the transition from one segment to another be more pronounced or marked or slowed. Providing a transition between segments can be accomplished by wiping of fading the video frames displayed on the screen of the playback unit near the beginning and/or end of a segment. In so doing, the viewing experience may be more enjoyable to some viewers.

A method for smoothing the transition between segments, and in general, for adding content, is represented in FIGS. 13A-13E, wherein a multi-media overlay segment 1302 is blended with or overlaid onto segments of the multi-media program material from the multi-media signal 302. Blending video is known to those of skill in the art and can be accomplished a number of ways. One way of blending video is on a frame-by-frame addition of pixels of one image into pixels of another image. Adding pixels can be performed by adding the binary values of the pixel in video memory and displaying the combined pixel value on screen.

When two or more multi-media programs are combined they are considered to be overlaid. An "overlay segment" 1302 is considered to be any sort of video, audio and/or data (e.g., closed captioning) other than the multi-media content being viewed in segments, which is made to appear or be heard substantially between the segments being played back in part, to provide a smooth the transition between segments.

Figure 13A:
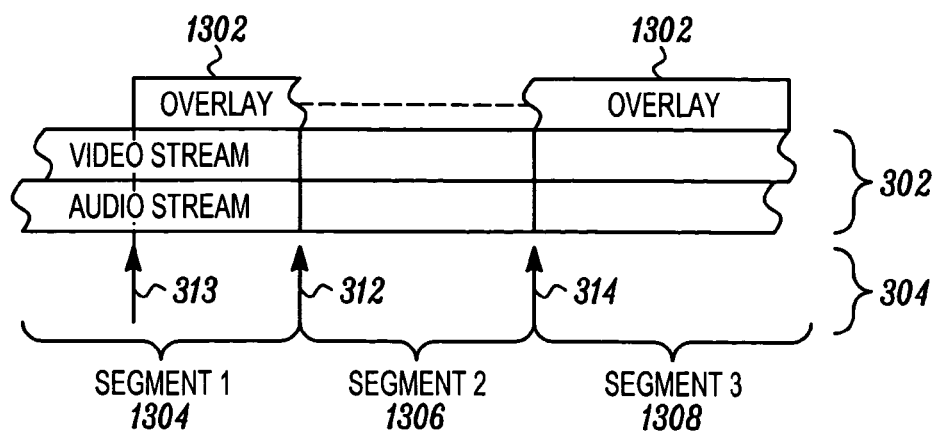
FIGS. 13A-13E depicts the addition of an overlay between segments to be played back.

In FIG. 13A, the multi-media program overlay segment 1302 play-back is started on the detection or occurrence of an overlay starting index 313, which is placed in, or attached to, the second or index track 304 depicted in FIG. 3. In FIG. 13A, the overlay starting index 313 causes the overlay segment 1302 to begin before the end of the first segment. The multi-media program overlay segment 1302 of FIG. 13A continues and extends over where the second segment would be if it were not to be skipped over, into the third multi-media program segment 1308. Inasmuch as the second or middle segment 1306 is skipped (also referred to as being suppressed) using the indexes 312 and 314 to mark segment points to skip over, the multi-media overlay segment 1302 can be thought of as extending through the second segment 1306.

Figure 13B:
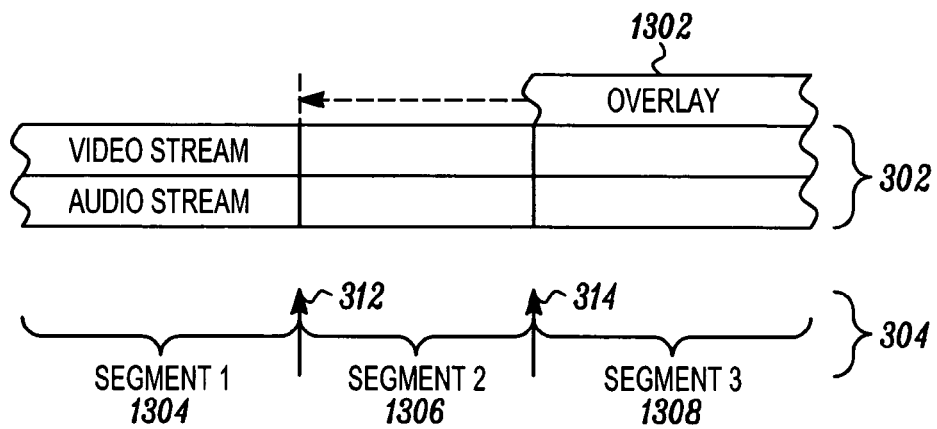

In FIG. 13B, the multi-media overlay segment 1302 is depicted as beginning at the start of the third segment 1308. Because the second segment is skipped over on the detection of the index marker 312, starting the multi-media overlay segment 1302 at the beginning of the third segment 1308 is functionally equivalent to starting the multi-media overlay segment at the end of the first segment 1304.

Figure 13C:
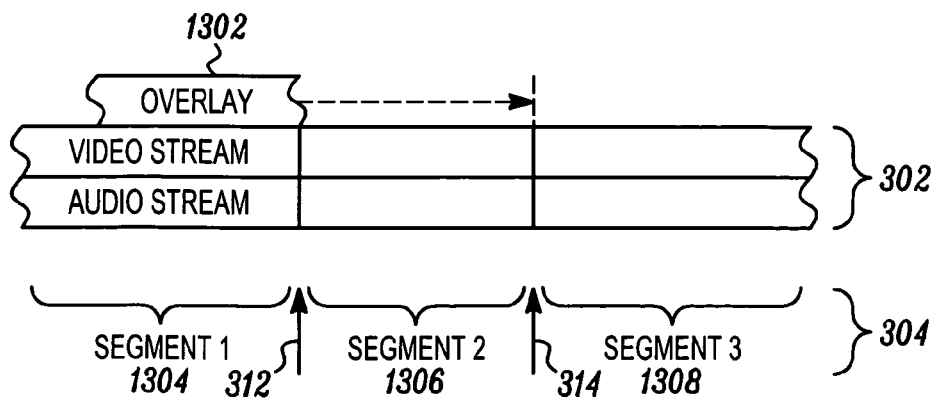

In FIG. 13C, the multi-media overlay segment 1302 begins during the first segment 1304 and ends at the conclusion of the first segment 1304. Ending the overlay segment at the conclusion of the first segment 1304 is equivalent to ending the overlay segment at the beginning of the third segment 1308.

Figure 13D:
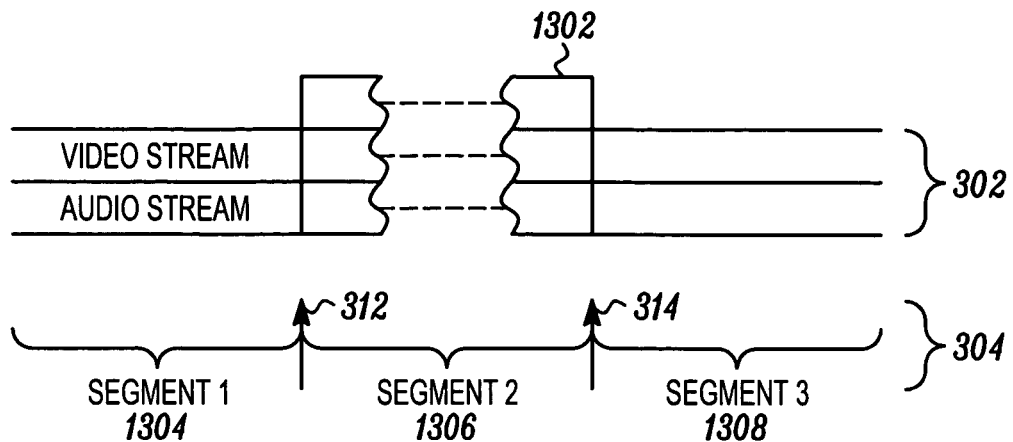

In FIG. 13D, the multi-media overlay 1302 is presented between the first segment 1304 and the third segment 1308. In such an embodiment, the overlay segment 1302 would appear to replace the multi-media stream 302 that was playing when the index 312 was detected.

Figure 13E:
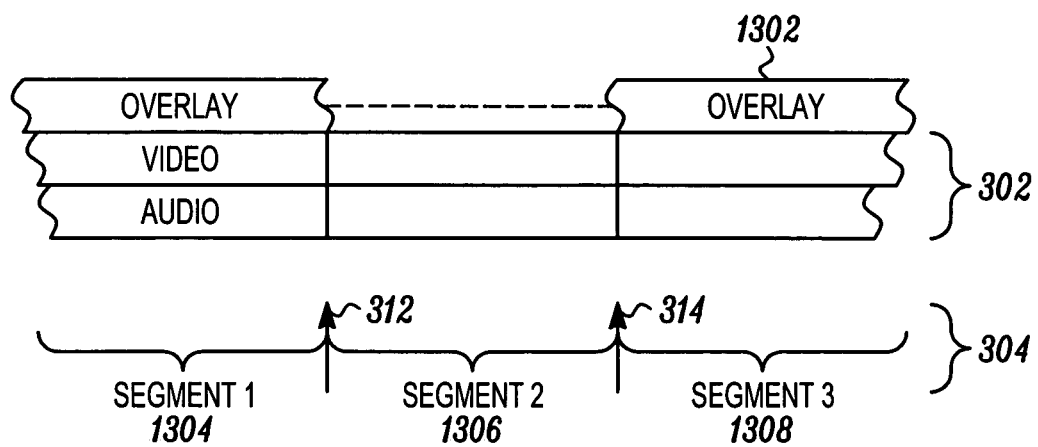

In FIG. 13E, the multi-media overlay 1302 is presented throughout the duration of both the first segment 1306 and the third segment 1308. An example of a multi-media overlay that would be streamed for the duration of a program would be a closed-captioning signal or a text band or video/audio band at the top or bottom of a video screen.

By presenting a multi-media overlay "on top of" program material being played back, transitions between segments 1304 and 1308 can be transitioned more smoothly from the perspective of the viewer. If the overlay content includes commercial advertising, a revenue stream can be generated by the presentation of advertising content that is more likely to viewed than say the advertisements recorded with program material but which are frequently skipped over by fast-forwarding the tape on which the program and advertising were recorded.

Those of skill in the art will appreciate that the multi-media overlay content can be related to the subject matter or content of the program material in the multi-media channel 302. By way of example, if the multi-media program channel 302 is a sporting event such as a football game, an overlay segment can be embodied as video frames that depict background or statistics about a player involved in the preceding or succeeding play. A multi-media overlay segment could include pictures, data, and/or narratives of players or other individuals.

In another embodiment, a multi-media overlay segment can include advertising material that appears as content related to the multi-media program being viewed, such as an advertisement related to a product endorsed by an athlete, a service or product of an organized sports league or organization, or alone. By splitting a viewer's screen and displaying player statistics in one window and an advertisement in another side-by-side window, revenue-generating advertising can be added to a multi-media program that is indexed to skip over and hence shorten the time required to review it.

In any of the embodiments depicted in FIGS. 13A-13E, merging or blending multi-media overlay signals into multi-media program material segments can be implemented using semi-transparent or opaque (solid color) video frames. For instance, an overlay segment can initially be of semi-transparent video under which multi-media program material would be observable. As the overlay segment proceeds, it can transition to solid video during which the overlay segment would replace at least part of at least one of the segments of the multi-media program. At a later time, the overlay stream can be weakened to semi-transparent so that the underlying multi-media program segment re-appears.

Overlay segment content can be determined by the content or subject matter of a multi-media program over which the overlay segment would be displayed. An example of such an embodiment would include displaying data on the performance or career of a player in a game being watched.

Overlay segment content can also be determined by a user's specification, such as a rate or speed of playback, wherein a faster playback would permit less and less overlay content between segments. A user can specify what sorts of information he or she wants to have added between segments with such specifications kept in a separate file or linked to or from the indexes. Examples of user playback specifications would include the time or speed at which a program should be reviewed.

Finally, the creation of an overlay segment can be accomplished by either a third party or by a local playback device, such as the third-party content sources identified in FIG. 10 by reference numeral 1010. Third-party overly content can be displayed on the display device 1012 depicted in FIG. 10 after being blended by the multi-media program player 1002, which is described above.

Those of ordinary and skill in the art will recognize that using the methodology and apparatus disclosed above that it is possible to review segments of multi-media programs either in order or out of order, depending upon the particular index or indices that a playback unit is programmed to look for. Multi-media segments can be played out of order by appropriate index selection criteria. In addition to selecting video segments out of order, it is possible to view a particular video segment while an audio segment associated with a different portion of a multi-media program is played with an out-of-order segment.

In most embodiments, segments will be reviewed in order of their occurrence from the original program material. In other embodiments, one video segment might be played back with an audio segment from a different portion or segment of a multi-media program.

The indexes described above can include annotations of the program material. Annotations of indexes should be considered to be those that comply with the Motion Picture Experts Group (MPEG) standards that include most recently the MPEG-7 standard. Those of ordinary skill in the art will recognize that over time, the Motion Pictures Experts Group may propose other standards by which annotations can be added to program material.

By appropriately indexing or marking multi-media program material to identify content segment by their relevant importance, content, or information depicted therein, it is possible to view multi-media program material in much less time without distorting the multi-media experience such as when a tape player is fast forwarded to only speed through scenes that have no interest.

What is claimed is:

1. A method comprising:
   receiving, by a device, information associated with a selection of a first criteria for a program;
   determining, by the device and based on the first criteria, a first plurality of segments, of the program, that correspond to the first criteria;
   determining, by the device and based on the first criteria, a second plurality of segments, of the program, that do not correspond to the first criteria,
   the first plurality of segments being different than the second plurality of segments;
   associating, by the device and based on the first plurality of segments, a first marker with a first segment of the first plurality of segments;
   associating, by the device and based on the first plurality of segments, a second marker with a second segment of the first plurality of segments;
   providing, by the device and based on the associated first marker, the first segment;
   suppressing, by the device, a third segment of the program, the third segment corresponding to one of the second plurality of segments;
   providing, by the device and during suppression of the third segment, added content for the program; and
   providing, by the device and based on the associated second marker, the second segment.

2. The method of claim 1, where the added content is at least one of:
   advertising content,
   viewer-supplied media content, or
   an annotation to the program.

3. The method of claim 1, where
   the first marker is associated with a beginning of the first segment,
   a third marker is associated with an end of the first segment, and
   when providing the added content, the method includes:
   providing the added content after detection of the third marker.

4. The method of claim 3, where, when providing the added content, the method includes:
   providing the added content during a period of time between detecting the third marker and detecting the second marker.

5. The method of claim 1, where, when providing the added content, the method includes:

providing, to a playback device and for presentation, the added content.

6. The method of claim 1, further comprising:
providing a prompt associated with the program,
where, when receiving the first criteria, the method includes:
receiving the first criteria based on the prompt.

7. The method of claim 1, further comprising:
receiving information associated with a selection of a second criteria for the program,
the second criteria being different than the first criteria;
determining, based on the second criteria, a third plurality of segments, of the program, that correspond to the second criteria; and
providing, after providing the first segment, a segment of the third plurality of segments.

8. An apparatus comprising:
a memory to store instructions; and
at least one processor to execute the instructions to:
receive information associated with a selection of a first criteria for a program;
determine, based on the first criteria, a first plurality of segments, of the program, that correspond to the first criteria;
determine, based on the first criteria, a second plurality of segments, of the program, that do not correspond to the first criteria,
the first plurality of segments being different than the second plurality of segments;
associate, based on the first plurality of segments, a first marker with a first segment of the first plurality of segments;
associate, based on the first plurality of segments, a second marker with a second segment of the first plurality of segments;
provide, based on the associated first marker, the first segment;
suppress a third segment of the program,
the third segment corresponding to one of the second plurality of segments;
provide, during suppression of the third segment, added content for the program; and
provide, based on the associated second marker, the second segment.

9. The apparatus of claim 8, where the added content is at least one of:
advertising content,
viewer-supplied media content, or
an annotation to the program.

10. The apparatus of claim 8, where
the first marker is associated with a beginning of the first segment,
a third marker is associated with an end of the first segment, and
the at least one processor, when providing the added content, is further to:
provide the added content after detection of the third marker.

11. The apparatus of claim 8, where the at least one processor is further to:
provide the added content during a period of time between detecting the third marker and detecting the second marker.

12. The apparatus of claim 8, where the at least one processor is further to:
provide, to a playback device and for presentation, the added content.

13. The apparatus of claim 8, where
the at least one processor is further to:
provide a prompt associated with the program, and
the at least one processor, when receiving the first criteria is further to:
receive the first criteria based on the prompt.

14. The apparatus of claim 8, where the at least one processor is further to:
receive information associated with a selection of a second criteria for the program, the second criteria being different than the first criteria;
determine, based on the second criteria, a third plurality of segments, of the program, that correspond to the second criteria; and
provide, after providing the first segment, a segment of the third plurality of segments.

15. A non-transitory computer-readable medium storing instructions, the instructions comprising:
one or more instructions which, when executed by a processor, cause the processor to:
receive information associated with a selection of a first criteria for a program;
determine, based on the first criteria, a first plurality of segments, of the program, that correspond to the first criteria;
determine, based on the first criteria, a second plurality of segments, of the program, that do not correspond to the first criteria,
the first plurality of segments being different than the second plurality of segments;
associate, based on the first plurality of segments, a first marker with a first segment of the first plurality of segments;
associate, based on the first plurality of segments, a second marker with a second segment of the first plurality of segments;
provide, based on the associated first marker, the first segment;
suppress a third segment of the program, the third segment corresponding to one of the second plurality of segments;
provide, during suppression of the third segment, added content for the program; and
provide, based on the associated second marker, the second segment.

16. The non-transitory computer-readable medium of claim 15, where the added content is at least one of:
advertising content,
viewer-supplied media content, or
an annotation to the program.

17. The non-transitory computer-readable medium of claim 15, where
the first marker is associated with a beginning of the first segment,
a third marker is associated with an end of the first segment, and
the one or more instructions to provide the added content include:
one or more instructions to provide the added content after detection of the third marker.

18. The non-transitory computer-readable medium of claim 15, where the one or more instructions further include:
one or more instructions to provide the added content during a period of time between detecting the third marker and detecting the second marker.

19. The non-transitory computer-readable medium of claim 15, where the one or more instructions further include:

one or more instructions to provide, to a playback device and for presentation, the added content.

20. The non-transitory computer-readable medium of claim 15, where
the instructions further include:
one or more instructions to provide a prompt associated with the program, and the one or more instructions to receive the first criteria, further include:
one or more instructions to receive the first criteria based on the prompt.

21. The non-transitory computer-readable medium of claim 15, where the instructions further include:
one or more instructions to receive information associated with a selection of a second criteria for the program, the second criteria being different than the first criteria;
one or more instructions to determine, based on the second criteria, a third plurality of segments, of the program, that correspond to the second criteria; and
one or more instructions to provide, after providing the first segment, a segment of the third plurality of segments.

* * * * *